March 31, 1959     J. R. MEDOR     2,879,915
COVER HOLDER
Filed Feb. 12, 1958

United States Patent Office 2,879,915
Patented Mar. 31, 1959

2,879,915

COVER HOLDER

Joseph Ralph Medor, Burlington, Vt.

Application February 12, 1958, Serial No. 714,928

2 Claims. (Cl. 220—85)

Open pans used for frying meats involve a considerable spattering of hot grease. Covered cooking utensils used for boiling foods often bubble over from the pressure of accumulating steam.

My invention provides means for supporting a pan's own cover in horizontal or near-horizontal position so as to provide a vent for the steam to escape and at the same time prevent grease from spattering. It can be used on any standard cooking utensil and enables the lid to be moved horizontally to provide a vent between its edge and the pan's top rim edge. The invention also provides a space for the handle of a stirring spoon to be placed therein with the bowl of said spoon inside the pan.

Although the drawings illustrate the attachment's use on frying pans, it is understood that the drawings and descriptions are for illustrative purposes only, and that the invention can be used on any standard cooking utensil. The drawings illustrate the preferred form of construction, but the design may be varied and other changes of minor detail may be made so long as there is no departure from the scope and spirit of the invention as claimed.

Reference is made to the accompanying drawing forming a part of this application, wherein like numerals refer to like parts throughout, and in which.

Figure 1:
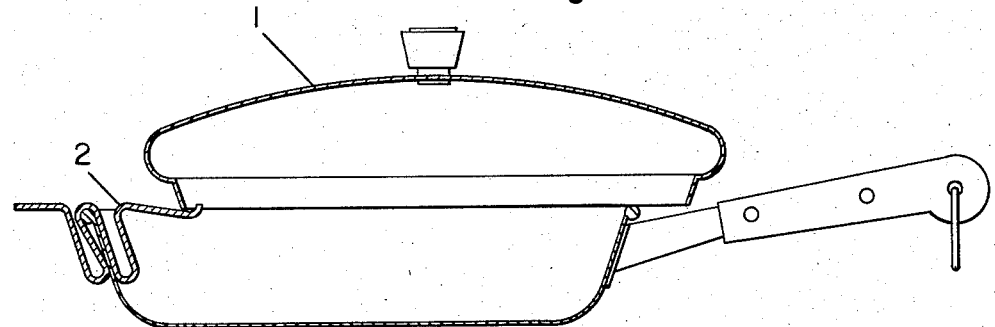
Figure 1 is a sectional view of a frying pan having one embodiment of a cover holder comprising my present invention.
Figure 3:
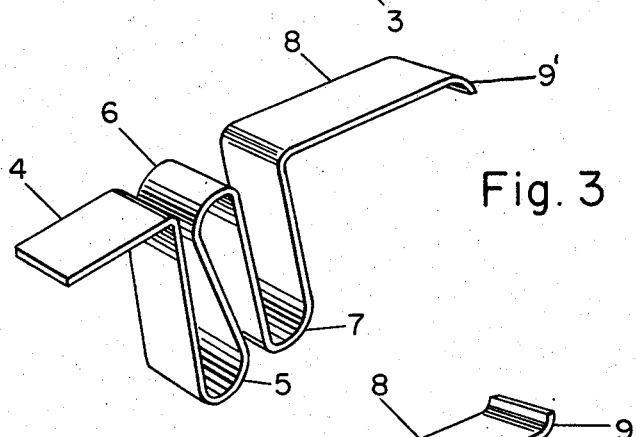
Figure 3 is a perspective view of another embodiment of a cover holder comprising my present invention.
Figure 2:
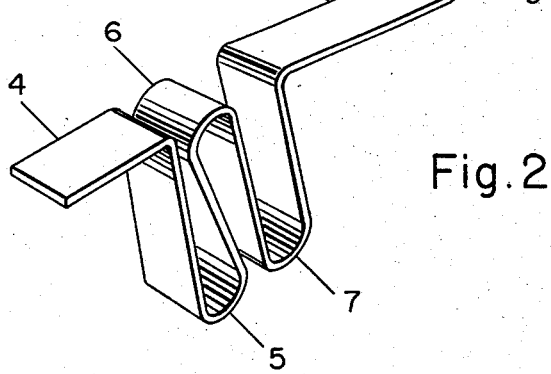
Figure 2 is a perspective view of the cover holder shown in Figure 1.

The numeral 1 designates the pan's own cover as it is in use on the pan with one edge resting atop the attachment, and its opposite edge resting atop the rim of the pan. Numeral 2 designates the cover holder as it is in use on a pan. Numeral 3 designates a frying pan.

The cover holder, designated as part 2, consists of a strip of metal having the qualities of both pliability and rigidity, e.g., rolled aluminum or stainless steel stripping, and has 180 degree bends for simplicity of structure, design and economy of manufacture, any one of which bend can be placed over and onto the rim of a utensil and thereby provide firm horizontal support for a cover as indicated.

Flat portion 4 on part 2 designates the handle for the cover holder, whose purpose is to enable the ready attachment and detachment of the device by simple finger motion. The handle is in approximate horizontal alignment with the upper portions of the cover holder, and is of such length as not to interfere with other pans on the range or stove.

The 180 degree bend 5 on part 2 has a side adjacent the outside rim edge of the utensil but not proximate its entire length, in order to facilitate the easy removal of the device.

Bend 6 on part 2 wraps itself over the rim so as to fit onto it, the left side of which is adjacent but not wholly proximate the outside rim edge of the utensil, and the right side of which is adjacent and in contact all along its length with the inside rim edge of the utensil. When the cover rests upon arm 8 providing vent for the escape of steam as illustrated, the weight of the cover bears down upon the entire length of the right side of bend 6 on part 2, and thus the pan's own cover functions in its natural horizontal position to prevent the cover holder 2 from wobbling or moving, while the same time the cover holder 2 prevents the cover edge from tipping downward into the pan.

Bend 7 on part 2 provides space for the cover to close without prior removal of the cover holder. Said space is of sufficient width for the handle of a spoon to be placed therein with the spoon's bowl resting atop and facing inwardly of the rim edge. Said space is of sufficient width for bend 7 on part 2 to wrap itself over the rim of utensils having a reinforced or thicker outside rim edge, when the cover is used for boiling foods. In this case, the cover holder is used in inverted position. Thus, the cover holder is adapted for horizontal or near-horizontal use, in either upright or inverted position, with the primary and ordinary use in upright position as illustrated.

Flat portion 8 on part 2 designates the arm upon which the cover edge rests when in use. The cover edge may rest at any point atop the arm to provide more or less vent at the discretion of the user. It is obvious from the elevational view, that an upward vent is created from the pan's cover edge to the pan's rim edge as the cover rests upon the arm, and that an equally spaced downward vent exists on the cover's opposite side, the whole cover being thus prevented from tilting or falling into or from the pan, and the whole serving to provide vent for the escape of steam and to prevent grease from spattering.

Lip 9 on part 2 designates a stop serving to prevent the cover from sliding off the arm and rim when the pan is moved.

Having thus described the invention, I claim:

1. A cover holder for a cooking utensil cover comprising an elongated strip of sheet metal the central portion of which is bent into the shape of a W and the terminal portions of which strip form an arm extending horizontally outwardly from the top end of each of the outer legs of the W and in the same plane as that of the top of the W, one of said arms having an upwardly turned lip at its free end, said one arm constituting a rest for the cover of the pan on which the cover holder may be used, the other of said arms constituting a handle for use in attaching or detaching the said holder from the said pan.

2. A cover holder for a cooking utensil cover comprising an elongated strip of sheet metal the central portion of which is bent into the shape of a W and the terminal portions of which strip form an arm extending horizontally outwardly from the top end of each of the outer legs of the W and in the same plane as that of the top of the W, one of said arms having a downwardly turned lip at its free end, said one arm constituting a rest for the cover of the pan on which the cover holder may be used, the other of said arms constituting a handle for use in attaching or detaching the said holder from the said pan.

References Cited in the file of this patent

UNITED STATES PATENTS

| 1,619,573 | Haines | Mar. 1, 1921 |
| 2,541,604 | Normandin | Feb. 13, 1951 |

FOREIGN PATENTS

| 414,859 | Great Britain | Aug. 16, 1934 |